United States Patent [19]
Tanigaki et al.

[11] Patent Number: 5,282,027
[45] Date of Patent: Jan. 25, 1994

[54] IMAGE PROJECTION DISPLAY AND PICK-UP APPARATUS WITH OPTICAL SHUTTER

[75] Inventors: Yasushi Tanigaki; Yoshikazu Satoh, both of Tokyo, Japan

[73] Assignee: U.S. Philips Corporation, New York, N.Y.

[21] Appl. No.: 926,135

[22] Filed: Aug. 5, 1992

Related U.S. Application Data

[63] Continuation of Ser. No. 691,924, Apr. 26, 1991, abandoned.

[30] Foreign Application Priority Data

Apr. 27, 1990 [JP] Japan ................................ 2-113990

[51] Int. Cl.⁵ ............................................. H04N 7/14
[52] U.S. Cl. ......................................... 358/85; 379/53
[58] Field of Search ............... 358/231, 60, 236, 247, 358/255, 253, 254, 85; 379/53; H04N 7/14

[56] References Cited

U.S. PATENT DOCUMENTS

| | | | |
|---|---|---|---|
| 2,909,097 | 10/1959 | Alden et al. | 358/60 |
| 4,400,725 | 8/1983 | Tanigaki | 358/236 |
| 4,928,301 | 5/1990 | Sinoot | 379/53 |

FOREIGN PATENT DOCUMENTS 3623029 1/1988 Fed. Rep. of Germany.
1288082 11/1989 Japan.

Primary Examiner—Ulysses Weldon
Assistant Examiner—Minsun Oh Harvey
Attorney, Agent, or Firm—Norman N. Spain

[57] ABSTRACT

An image projection display and pick-up apparatus includes a display screen with controllable tranmissivity, and image projection device behind the screen for projecting an image onto the rear surface of the screen, and an image pick-up device, also located behind the screen, for picking up an image of a viewer located in front of the screen, and an optical shutter for preventing light from the projection device to reach the screen during image pick-up.

1 Claim, 3 Drawing Sheets

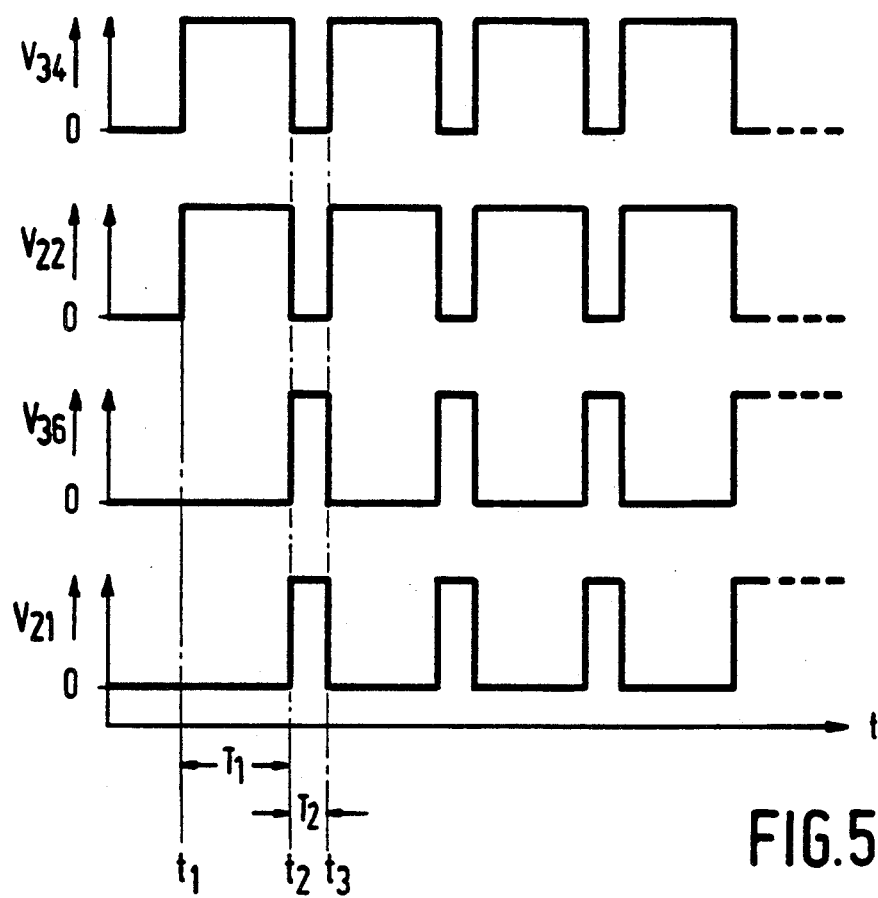
FIG.5
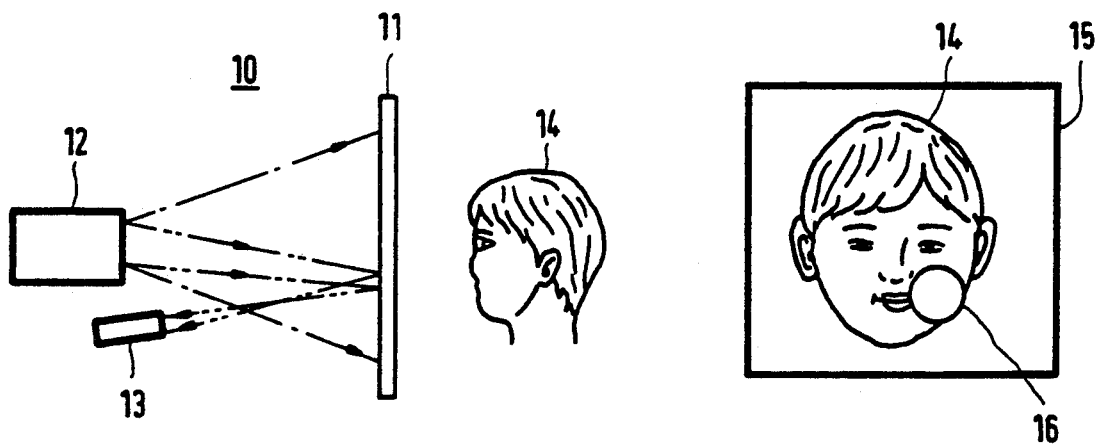
FIG.6
PRIOR ART
FIG.7
PRIOR ART

IMAGE PROJECTION DISPLAY AND PICK-UP APPARATUS WITH OPTICAL SHUTTER

This is a continuation of application Ser. No. 07/691,924, filed Apr. 26, 1991, is now abandoned.

BACKGROUND OF THE INVENTION

This invention relates to an image display and pick-up apparatus comprising a screen with controllable transmissivity.

Such apparatus, which can be used in a so-called videophone or for video conference meetings, is known, for example, from the German Patent Publication No. DE 3623029 A1.

As shown in FIG. 6, the conventional image display and pick-up apparatus 10 comprises an image projecting section 12 and an image pick-up section 13 which are both arranged behind a screen 11. When an image is displayed to a user 14, the screen 11 is in a light scattering condition (blurring condition), so that an image from the section 12 and projected on the rear side of screen 11 becomes visible. When an image of the user 14 is to be taken, the screen 11 is brought to a light transmitting condition so that light from the subject 14 can reach the image pick-up section 13.

When using such apparatus in a videophone, it is possible to establish an eye contact between the user 14 and another user via a telephone line.

The conventional image display and pick-up apparatus has the disadvantage that, even if the screen 11 is in the light transmitting condition, the signal light from section 12 is not fully transmitted by the screen 11, but part of this light is reflected by the rear surface of the screen and can reach the image pickup section 13 as indicated by two dot-and-dash lines in FIG. 6. This reflected light interferes with the light from the subject 14 passing through the screen 11, so that a disturbance, in the form of a spot 16, appears in the image 15 picked up by the image pick-up section 13 and displayed at the site of the other user as shown in FIG. 7.

OBJECT AND SUMMARY OF THE INVENTION

The object of the invention is to meet this drawback and to provide an improved image display and pick-up apparatus.

The apparatus according to this invention is characterized by a controllable optical shutter for preventing the signal light from reaching the screen, when the subject is to be picked up by the image pick-up device.

An embodiment of the invention will be described in detail with reference to the accompanying drawings in which.

FIG. 5a to d are a four-part time chart showing the operation of said embodiment;

FIG. 6 is a diagrammatic illustration showing one example of a conventional image display and pick-up apparatus;

FIG. 7 is a plan view of the screen of a conventional apparatus on which an image is displayed.

DESCRIPTION OF THE PREFERRED EMBODIMENTS

Figure 1:
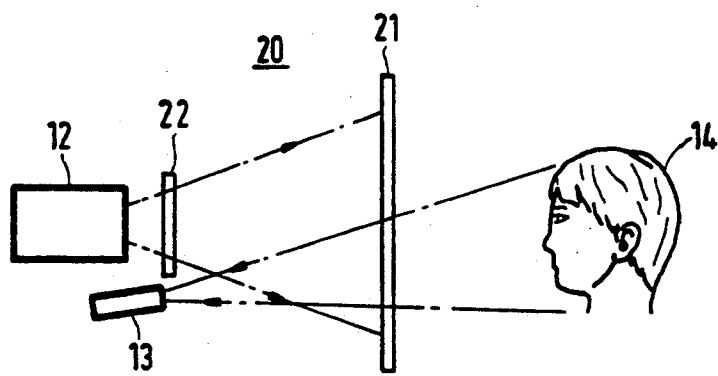
FIG. 1 is a diagrammatic illustration showing the basic structure of the image display and pick-up apparatus according to the invention.

FIG. 1 shows a basic arrangement of an image display and pick-up apparatus 20 according to the invention. Similarly to the conventional apparatus 10 illustrated in FIG. 6, the apparatus 20 comprises a screen 21 driven by a drive circuit (not shown) so as to be brought to a light transmitting condition or a light scattering condition (blurring condition), an image projecting device 12 and an image pick-up device 13 which are arranged behind the screen. Further, according to the invention, a shutter 22 for blocking a signal light emitted by the image projecting device 12 is arranged in the light path between the image projecting device and the screen 21.

When an image from the device is to be displayed, the shutter 22 is in the light transmitting condition, while the screen 21 is in the light scattering condition. Since the light including image information, emitted by the image projecting device 12 is incident upon the back side of the screen 21, an image is formed on the front side of the screen, so that a user 14 residing in front of the screen can see the displayed image.

When a subject 14 is to be picked up, the shutter 22 is brought to the light blocking condition, while the screen 21 is brought to the light transmitting condition. Under this condition, an optical image of the subject 14, which is located in front of the screen 21, passes through the screen 21, reaches the image pick-up device 13, and is converted to an electric signal. Since the light from the image projecting device 12 is blocked by the shutter 22, it cannot reach the screen 21, so that the picked-up optical image of the subject is not at all disturbed or interrupted.

An embodiment of the image display and pick-up apparatus 20 will be described in more detail with reference to FIGS. 2 through 5.

Figure 2:
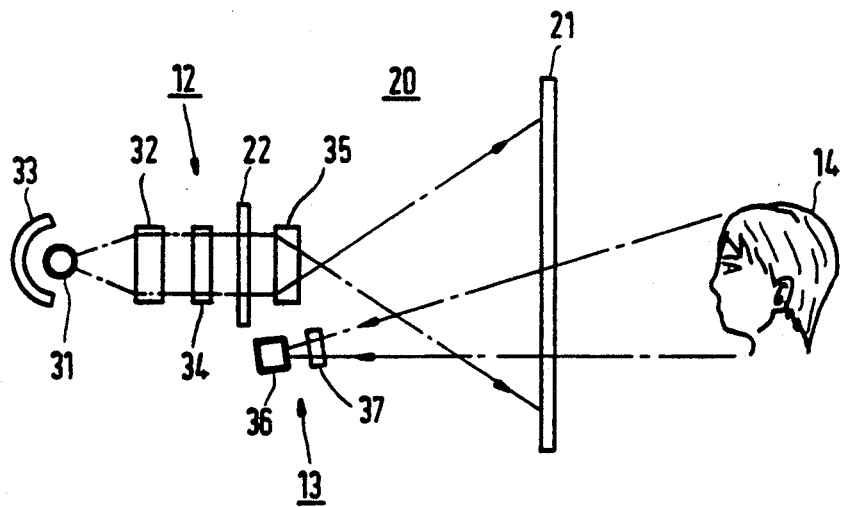
FIG. 2 is a diagrammatic illustration showing a more detailed embodiment of the invention.

In FIG. 2, the image projecting device 12 comprises a light source 31 such as a metal halide lamp, a halogen lamp or the like, a collimator lens 32 for converting the divergent source radiation into a parallel beam, and a mirror 33 for reflecting the light from the light source 31 towards the collimator lens. Moreover, the image projecting device 12 comprises a transmission-type display element 34 of, for example, one (1) inch upon which the light from the collimator lens 32 is incident and which is driven by a display control circuit to be described subsequently, and a projection lens 35 for forming a magnified image of the display element onto the rear face of the screen 21 under an in-focus condition. Element 34 may be a color liquid crystal display element of the known type having a plurality of picture-elements controlled by electrodes which are driven by TFTs for example. A liquid crystal shutter 22, which can be switched between a light transmitting condition and a light blocking condition under control of a voltage (not shown), is arranged between the display element 34 and the projection lens 35 of the image projecting device 12. Further, a screen 21 is also provided which may comprise a liquid crystal panel and which can be switched between a light transmitting condition and a light scattering condition in accordance with a control voltage (not shown).

An image pick-up device 13 comprises an image sensor 36 such as CCD or the like, and a camera lens 37 for forming through the screen 21 an optical image of a subject 14 onto the image sensor. The image projecting device 12 is so arranged that its optical axis is substantially perpendicular to the screen 21, and the image pick-up device 13 is so arranged that its optical axis approaches the optical axis of the image projecting device as far as possible and extends generally parallel to the latter optical axis.

Figure 3:
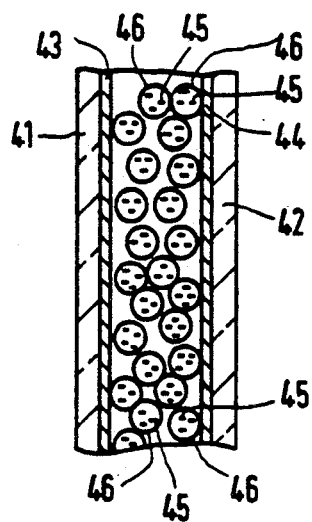
FIG. 3 is an enlarged cross sectional view of parts of the screen and shutter of said embodiment.

Both the liquid crystal shutter 22 and the screen 21 may be composed, for example, as illustrated in FIG. 3.

In FIG. 3, the reference numerals 41 and 42 denote transparent plates such as glass or the like which are arranged parallel to each other. Transparent electrodes 43 and 44 such as ITO or the like are provided on inward faces of the respective plates 41 and 42 substantially over their entire surfaces. Further, a plurality of transparent-resin capsules 46, in which liquid crystal 45 is enclosed, are arranged between the electrodes 43 and 44, the gaps between the capsules being filled with binder. This liquid crystal device, constructed as described above, is brought to the light transmitting condition when voltage is applied between the electrodes 43 and 44, while the liquid crystal device is brought to the light blocking condition or light scattering condition (that is, blurring condition) when the voltage is brought substantially to zero. The switching speed of the liquid crystal device is fast.

Figure 4:
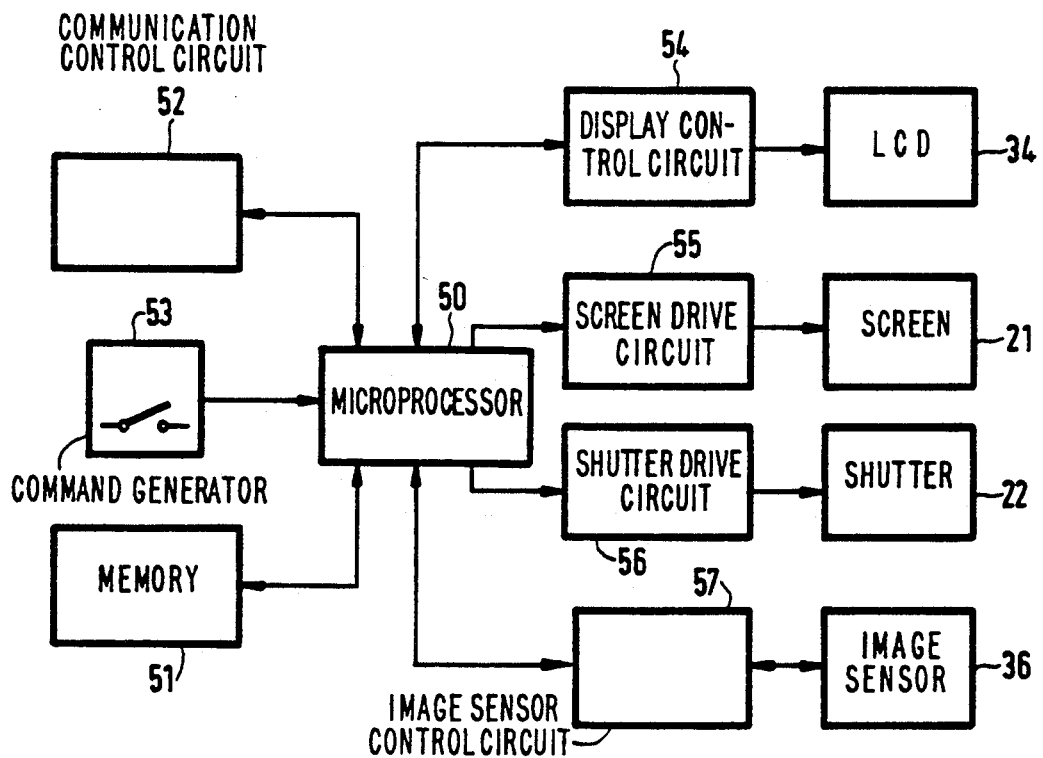
FIG. 4 is a block diagram showing the structure of the control circuit of said embodiment.

FIG. 4 shows in block diagram form an arrangement of a control circuit for the image display and pick-up apparatus 20. In the figure, the reference numeral 50 denotes a microprocessor which performs control functions on various sections of the apparatus on the basis of a control program stored in a memory 51. The memory 51 is provided also with memory regions for storing therein various data or the like required in the apparatus. The reference numeral 52 designates a communication control circuit which, on the one hand, for example, receives an image signal which is to be displayed from a telephone line or the like, and on the other hand sends a picked-up image signal to the telephone line. The communication control circuit is connected to the microprocessor 50. The reference numeral 53 denotes an operation section of the apparatus. A user operates switches or the like provided in the operation section to generate a command to pick-up the subject or other commands. The reference numeral 54 denotes a display control circuit for forming an image based on the received image signal, onto the liquid crystal display element 34 under the control of the microprocessor 50. Moreover, a screen drive circuit 55 is provided which is controlled by the microprocessor 50 and which drives the screen 21. The drive circuit supplies a voltage between the electrodes 43 and 44 of the screen 21 at predetermined time intervals under the control of the microprocessor 50, whereby the screen is brought to the light scattering condition or the light transmitting condition. Likewise, a shutter drive circuit 56 applies voltage between the electrodes 43 and 44 of the shutter 22 at predetermined time intervals under the control of the microprocessor 50, whereby the shutter is brought to the light transmitting condition or the light blocking condition. Furthermore, an image-sensor control and drive circuit 57 drives the image sensor 36 in accordance with the command of the microprocessor 50 and, as a result, sends out an image signal outputted from the image sensor, to the microprocessor 50.

The operation of the apparatus 20 will now be described with reference to the time chart of FIG. 5.

It is assumed that in the initial condition, no voltage is applied between the electrodes 43 and 44 of the screen 21 and the shutter 22, respectively, so that the screen and the shutter are in the light scattering condition and the light blocking condition, respectively. So in the initial condition $V_{21}$ and $V_{22}$ are zero. When a user at the time $t_1$ operates a switch on the operation section 53 to select the display, the microprocessor 50 takes in an image signal received by the communication control circuit 52 and supplies the image signal to the display control circuit 54, to form an image on the display element 34. Compare $V_{34}$. Simultaneously therewith, the microprocessor 50 controls the shutter drive circuit 56 to apply a voltage $V_{22}$ of, for example, 50 volts between the electrodes 43 and 44 of the shutter 22, thereby bringing the shutter into the light transmitting condition. Thus, the signal light from the display element 34 passes through the shutter 22 and reaches the screen 21 (which is still in the light scattering condition), so that the image is displayed. After a time interval $T_1$ of, for example, about 20 ms, the microprocessor 50 halts operation of the display control circuit 54 and controls the shutter drive circuit 56 to bring the shutter 22 to the light cutting-off condition; $V_{22}$ is zero. Simultaneously therewith, the microprocessor 50 applies a voltage, $V_{21}$ of, for example, 100 V between the electrodes 43 and 44 of the screen 21 by means of the screen drive circuit 55 to bring the screen to the light transmitting condition, and to start operation of the image sensor 36 through the image-sensor control and drive circuit 57; compare $V_{36}$. During a time interval $T_2$ of, for example, about 2 ms, the image sensor is active. At the time $t_3$ the microprocessor 50 stops the image-sensor control and drive circuit 57, and halts operation of the drive circuit 55 so that the screen 21 is again brought to the light scattering condition. Simultaneously therewith, the microprocessor 50 operates the display control circuit 54 in a manner similar to that described previously, to again bring the shutter 22 to the light transmitting condition. Subsequently, the above-described operation will be repeated as long as the display and image pick-up apparatus is in use.

In the above embodiment the display element 34 is a transmission-type liquid crystal display element which uses TFTs. If, however, the display element is not of a transmission-type, the display element may be one of other types.

Further, the shutter 22 has been described as being a liquid crystal shutter of capsule type. However, the invention is not limited to this kind of shutter, and other liquid-crystal shutters, an EC shutter, a conductive high-molecular shutter or the like may be used provided that the difference in transmissivity between the on- and off-state is large and the switching speed is high.

Furthermore, the shutter need not be located between the display element and the projection lens, but can be located at any position where it can prevent light from the image projecting device from reaching the screen.

Moreover, instead of liquid crystal display element 34, the image projecting device 12 may also comprise a high-intensity CRT and a projection lens.

We claim:

1. An image projection display and pick-up apparatus operating in a display mode and a pick-up mode and comprising:
   a viewing screen with controllable transmissivity;

an image projection device disposed behind the screen comprising image display means for generating a picture and means for projecting this picture on the back surface of the viewing screen to thereby display the picture image to a viewer in front of the viewing screen;

an image pick-up device disposed behind the viewing screen for taking pictures of the viewer through the screen:

the image pick-up device and the image projection device being arranged one above the other; and characterized by the presence of a controllable shutter in the image projection device, which shutter is kept opaque during the image pick-up mode, thereby preventing light from the image projection device from reaching the viewing screen during the image pick-up mode and the image pick-up device being arranged relative to the shutter so that no light from the viewer is prevented by the shutter, from reaching the image pick-up device and is prevented, by the image pick-up device, from reaching the shutter and wherein the projection device comprises in this order: a light source, a transmission type video display element and a projection lens, said shutter being arranged between the light source and the projection lens.

* * * * *